United States Patent [19]

Kitera et al.

[11] Patent Number: 4,839,495
[45] Date of Patent: Jun. 13, 1989

[54] LASER BEAM WELDING APPARATUS FOR AN INNER CIRCUMFERENTIAL SURFACE OF A TUBE

[75] Inventors: Takuya Kitera; Shoichi Urushibata; Masatoshi Sato; Tadashi Nagashima; Shoichi Hamada; Isao Shirasu, all of Kobe; Yasumi Nakura, Takasago; Michito Sakamoto, Takasago; Takashi Ishide, Takasago; Naruo Sakamoto, Takasago; Masahiko Meka, Takasago; Masaru Tomeoka, Kobe, all of Japan

[73] Assignee: Mitsubishi Jukogyo Kabushiki Kaisha, Tokyo, Japan

[21] Appl. No.: 222,170

[22] Filed: Jul. 21, 1988

[30] Foreign Application Priority Data

Jul. 21, 1987 [JP] Japan .................. 62-181960
Jul. 24, 1987 [JP] Japan .................. 62-183670

[51] Int. Cl.[4] ............................................. B23K 26/00
[52] U.S. Cl. ............................. 219/121.63; 219/121.78
[58] Field of Search .................. 219/121.63, 121.64, 219/121.78, 121.84

[56] References Cited

U.S. PATENT DOCUMENTS

| | | | |
|---|---|---|---|
| 3,772,496 | 11/1973 | Harinxma | 219/121.84 X |
| 4,029,932 | 6/1977 | Cook | 219/121.82 X |
| 4,044,936 | 8/1977 | Obersby et al. | 219/121.72 X |
| 4,713,519 | 12/1987 | Bersch et al. | 219/121.6 X |

FOREIGN PATENT DOCUMENTS 0041091 4/1981 Japan .................. 219/121.63
0091992 7/1981 Japan .................. 219/121.63

Primary Examiner—C. L. Albritton
Attorney, Agent, or Firm—Wenderoth, Lind & Ponack

[57] ABSTRACT

An improved laser beam welding apparatus for an inner circumferential surface of a tube is disclosed herein, which apparatus comprises an elongated flexible tube containing an optical fiber extended along the length thereof so as to transmit a laser beam, position detecting means disposed in the vicinity of the top end of the flexible tube to determine relative positioning thereof with respect to a work tube in which the flexible tube is inserted, holding means provided with an expander and disposed adjacent to the position detecting means for holding the tip end of the flexible tube in the work tube, rotary drive means disposed closer to the tip end of the flexible tube than the holding means, a rotary cylinder connected to the rotary drive means to be rotated with respect to the flexible tube, guide means mounted on the rotary cylinder in a relatively rotatable manner with respect to the rotary cylinder and held in contact with the inner surface of the work tube for supporting the rotary cylinder in a concentric relation to the work tube, and an optical train arranged with the rotary cylinder for receiving a laser beam emitted from the optical fiber and focusing a reflected laser beam onto the inner surface of the work tube.

6 Claims, 5 Drawing Sheets

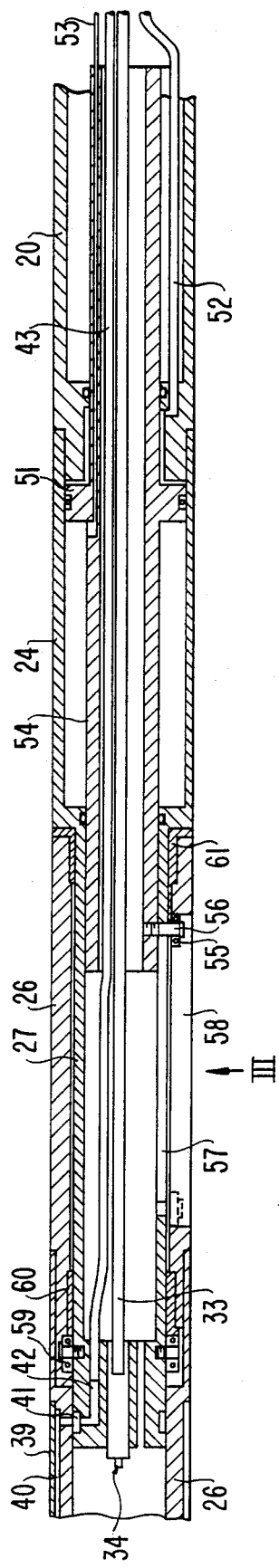
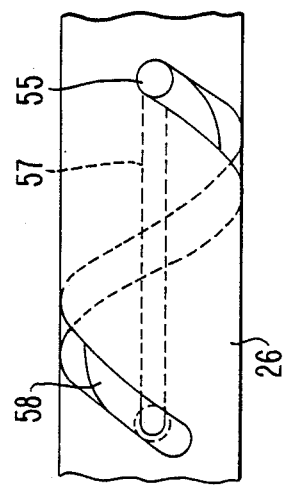
FIG. 2
FIG. 3

LASER BEAM WELDING APPARATUS FOR AN INNER CIRCUMFERENTIAL SURFACE OF A TUBE

BACKGROUND OF THE INVENTION

1. Field of the Invention

The present invention relates to an apparatus for performing circumferential seal welding between a thin tube such as a heat transfer tube in a heat-exchanger or the like and a mending sleeve inserted into that tube so as to internally cover a damaged location occurred in this thin tube.

2. Description of the Prior Art

Though it is quite natural that in steam prime motors or various electric power stations which directly made use of thermal energy, boilers as well as superheaters, feed water preheater, air preheater, condensor, etc. associated with boilers play a principal role, in various chemical industries such as the petrochemical industry and the petroleum industry, also a heat-exchanging system or a heat-exchanger is widely used in various steps of a process. Especially, a multi-tube cylindrical type heat-exchanger that is common as a large-sized heat-exchanger has a wide scope of utility, and it can well endure the use even in the high-temperature high-pressure system industry.

Now, as one of the most important associated installations in a nuclear-reactor for electric power generation, a steam generator which generates steam for rotating turbine blades has been known. In general, a steam generator used in a pressurized water reactor is one kind of the multi-tube cylindrical type heat-exchangers in which secondary water is evaporated by heat-exchange with primary water heated in a nuclear reactor. A general internal structure of such steam generator is shown in FIG. 11, in which a lower end portion of a vertical type cylindrical shell 1 is partitioned by a header plate 2 to form a hemi-spherical water chamber 3, which is further divided into two chambers by means of a vertical partition wall 4, and the opposite end ports of a large number of steam thin tubes 5 extending in a U-shape penetrate the header plate 2 and are opening, respectively, in these two water chambers 3. These steam thin tubes 5 are supported within the cylindrical shell 1 by the intermediary of a plurality of support plates 6. High-temperature primary water fed from a nuclear reactor not shown enters one water chamber 3 through an inlet nozzle 7 communicating with that water chamber, then reaches the other water chamber 3 through the steam thin tubes 5, and flows back to the nuclear reactor through an outlet nozzle 8 communicating with the last-mentioned water chamber 3, and during the period when it passes through these steam thin tubes, it performs heat-exchange with secondary water for actuating a turbine which water is fed into the cylindrical shell 1 through a water feed nozzle 9. The secondary water that has become high-temperature steam in the above-described manner is adapted to be furnished to a steam turbine not shown from the top portion of the cylindrical shell 1.

Normally, in an installation relating to atomic energy, in addition to that the materials used in the installation are severely selected, quality control for the materials is carried out very strictly. In the above-described steam generator also, during its operation various inspections and repairs accompanying the inspections are conducted periodically, and in the event that anomaly of a steam thin tube should be found in one of the steam thin tubes, treatment for removing it from service as described in the following is effected. That is, for the purpose of preventing the high-pressure primary water from leaking out externally of the steam thin tube, blind plugs are fitted to the opposite end ports of the particular steam thin tube, seal welding is effected around the blind plugs, and thereby this steam thin tube is closed.

According to the method of blocking heat transfer tubes for which damage has been discovered in a multi-tube cylindrical type heat-exchanger, there is a fear that as the number of damaged heat transfer tubes increases, degradation of the capability of a heat-exchanger may become remarkable and the efficiency of the entire plant also may be deteriorated. Therefore, an alternative method was proposed, in which in place of the blind plugs a mending sleeve 102 is inserted into a heat transfer tube 103 so as to cover a damaged location 101 and the opposite end portions of this mending sleeve 102 are circumferentially seal-welded to the heat transfer tube 103 as shown in FIG. 12.

However, in the last-mentioned method, in the case where the material of the heat transfer tube is special material, it is necessary to use adequate high-temperature solder material, and so, in addition to difficulty in working, often the metallurgical structure of the heat transfer tube and the mending sleeve would be changed due to the high temperature upon welding. Hence, another method has been also proposed, in which in place of the aforementioned welding, an annular protrusion is formed around the outer circumferential surface of the mending sleeve, and air-tightness is maintained by expanding the mending sleeve to make the protrusion bite into the inner circumferential surface of the heat transfer tube. However, even according to the last-mentioned method, in the case where the heat transfer tube has been already expanded, the expanded portion is work-hardened, hence in view of the necessity of making the protrusion of the mending sleeve bite into the inner circumferential surface of the heat transfer tube, the material of the mending sleeve must be sufficiently hard as compared to the material of the heat transfer tube, and thus there exist various restrictions.

SUMMARY OF THE INVENTION

It is therefore one object of the present invention to provide a laser beam welding apparatus for an inner circumferential surface of a tube, which can perform favorable circumferential seal welding between a work tube and a mending sleeve inserted into the work tube without being influenced by the properties of materials forming the work tube and the mending sleeve.

According to one feature of the present invention, there is provided a laser beam welding apparatus for an inner circumferential surface of a tube, comprising an elongated flexible tube containing an optical fiber extended along the length thereof so as to transmit a laser beam, position detecting means disposed in the vicinity of the tip end of the flexible tube to determine relative positioning thereof with respect to a work tube in which the flexible tube is inserted, holding means provided with an expander and disposed adjacent to the position detecting means for holding the tip end of the flexible tube in the work tube, rotary drive means disposed closer to the tip end of the flexible tube than the holding means, a rotary cylinder connected to the rotary drive means to be rotated with respect to the flexible tube, guide means mounted on the rotary cylinder in a relatively rotatable manner with respect to the rotary cylinder and held in contact with the inner surface of the work tube for supporting the rotary cylinder in a concentric relation to the work tube, and an optical train arranged within the rotary cylinder for receiving a laser beam emitted from the optical fiber and focusing a reflected laser beam onto the inner surface of the work tube.

According to another feature of the present invention, there is provided the above-featured laser beam welding apparatus, wherein the rotary drive means is composed of an electric motor and a gear train.

According to still another feature of the present invention, there is provided the first-featured laser beam welding apparatus, wherein the rotary drive means is composed of a pneumatic rotary actuator.

According to yet another feature of the present invention, there is provided the above-featured laser beam welding apparatus, further including a gas tube extended in and along the flexible tube, and a gas flow channel defined so as to conduct compressed gas to a welding point on the inner surface of the work tube.

According to a further feature of the present invention, there is provided the first-featured or the last-feature laser beam welding apparatus, further including another gas flow channel adapted to receive the compressed gas and extended to a reflector in the optical train for conducting a cooling and cleaning gas along the surfaces of optical elements in the optical train.

According to a still further feature of the present invention, there is provided the first-featured or the fourthly featured laser beam welding apparatus, wherein the optical fiber is connected to a laser beam generator through a tapered fiber and a lens adapted to collect a laser beam emitted from the laser beam generator and transmit the beam to the optical fiber.

In operation, the flexible tube inserted into a work tube is made to stop at a predetermined working location with the aid of the location detecting means, and the flexible tube is fixed to the work tube by making use of the holding means. At this moment, the rotary cylinder is held in a concentric relation to the work tube by the guide means, and starting from this condition, the welding laser beam is irradiated onto the inner surface of the work tube via the optical train, at the same time the rotary cylinder is rotated by the rotary drive means, and thereby the welding laser beam is made to scan in an annular shape on the inner surface of the work tube.

According to the present invention, since a laser beam is used for circumferential seal-welding between a work tube and a mending sleeve, excellent circumferential seal-welding has become possible without being influenced at all by the properties of materials of the mending sleeve and the work tube. In addition, there is no need to set a welding location at the tube end of the mending sleeve, and so, the positioning work for the welding location can be greatly simplified as compared to the welding apparatus in the prior art.

Furthermore, in operation, since compressed gas is led to a welding point on the inner surface of the work tube through a gas flow channel, spatter and fume produced during welding can be prevented from adhering to the optical train and thus deteriorating optical performance thereof (for instance, a transmittivity of a lens, a reflecting power of a reflecting mirror, etc.). In addition, the compressed gas flows through another gas flow channel and along the surfaces of the optical elements in the optical train up to the reflector at the extremal end for cooling the optical elements in the optical train to prevent overheating thereof, and also for cleaning these optical elements to prevent deterioration of their optical performance. Still further, to the optical fiber extending within the flexible tube is transmitted a laser beam focused through a tapered fiber and a lens, hence a laser beam having a high energy density can be obtained, and also the laser beam can be transmitted to the optical train by making use of an optical fiber having a small diameter.

The above-mentioned and other objects, features and advantages of the present invention will become more apparent by reference to the following description of preferred embodiments of the invention taken in conjunction with the accompanying drawings.

BRIEF DESCRIPTION OF THE DRAWINGS

In the accompanying drawings:

FIG. 2 is a cross-section view of a rotary drive section according to a second preferred embodiment of the present invention;

FIG. 3 is a partial side view of the same rotary drive section as viewed in the direction of an arrow III;

DESCRIPTION OF THE PREFERRED EMBODIMENTS

Figure 1:
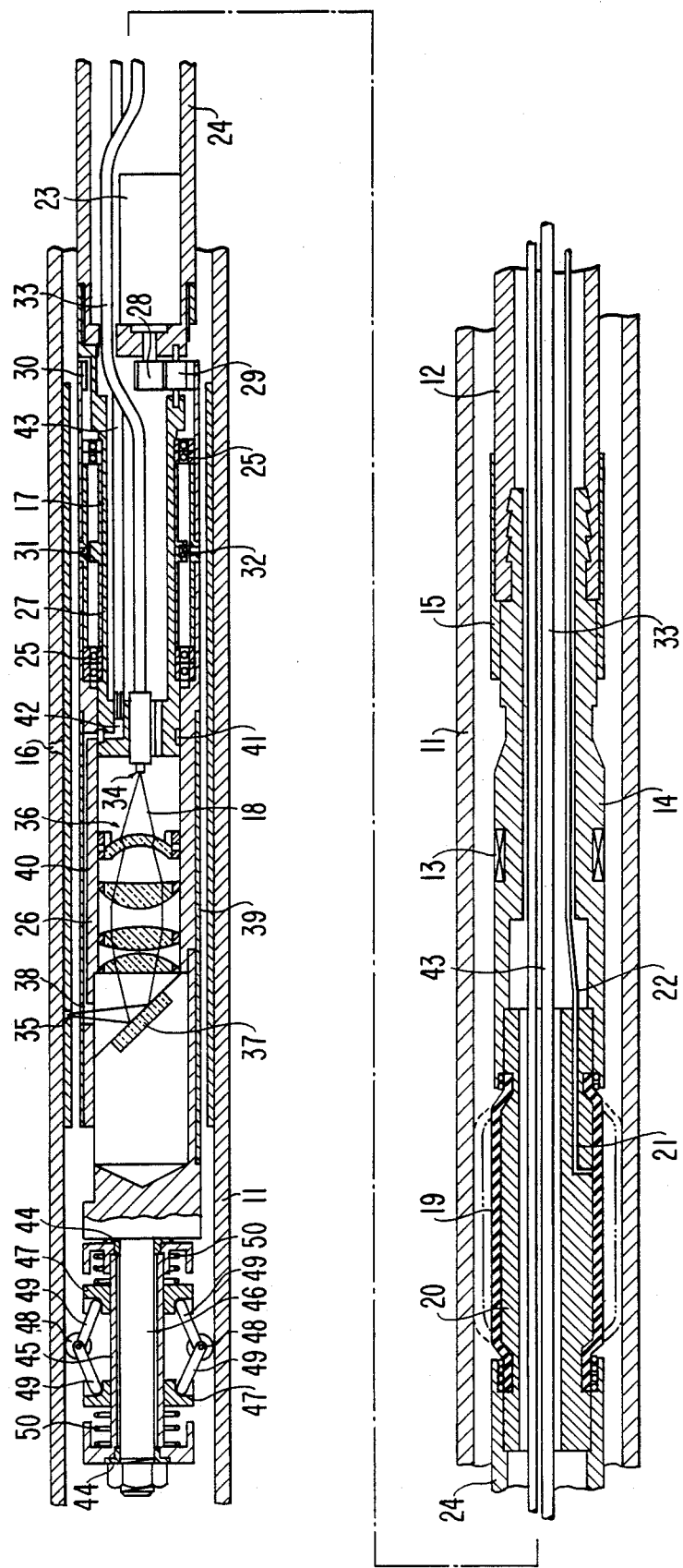
FIG. 1 is a cross-section view showing a first preferred embodiment of the present invention.

In the following, description will be made on a first preferred embodiment of the present invention, in which the laser beam welding apparatus for an inner circumferential surface of a tube according to the present invention is applied to circumferential seal welding between a heat transfer tube in a heat-exchanger and a mending sleeve internally covering a defective location formed in this heat transfer tube. A cross-section of the structure of the laser beam welding apparatus is shown in FIG. 1, in which at the tip end of a flexible tube 12 to be inserted into a heat transfer tube 11 is integrally fitted by means of a lock metal 15 a connecting cylinder 14 having a position detector 13, which is of eddy current type in the illustrated embodiment, mounted on its outer circumferential surface. The above-mentioned position detector 13 is provided for the purpose of detecting the position of a mending sleeve 17 inserted into the heat transfer tube 11 and positioned so as to cover a defective location 16 of the heat transfer tube 11 or a header plate and a support plate not shown in a heat-exchanger, and also for the purpose of setting an irradiating position of a welding laser beam 18 as will be described later such as an Nd:YAG laser, a $CO_2$ gas laser, etc. As a matter of course, position detectors of other than eddy current type can be employed.

At the tip end of the aforementioned connecting cylinder 14 is integrally fitted an intermediate cylinder 20 covered by an air bag 19 made of synthetic rubber or the like having an appropriate mechanical strength and a sufficient expansibility, and in this intermediate cylinder 20 is formed an air feed/discharge hole 21 opening at the outer circumferential surface of the intermediate cylinder 20 for feeding compressed air into the space between the outer circumferential surface of the intermediate cylinder 20 and the inner circumferential surface of the cylindrical air bag 19. To this air feed/discharge hole 21 is connected an air feed/discharge tube 22 which extends through the connecting cylinder 14 and the flexible tube 12 and communicates with an air feed/discharge device not shown, and when compressed air is fed into the air bag 19 through the air feed/discharge tube 22 and the air feed/discharge hole 21 by means of this air feed/discharge device, the air bag 19 expands and comes into tight contact with the inner surface of the heat transfer tube 11 as shown by double-dot chain lines in FIG. 1, so that the tip end portion of this welding apparatus can be fixedly held with respect to the heat transfer tube 11. It is to be noted that in place of compressed air, other gas or liquid could be employed, and in place of the air bag 19 used in the illustrated embodiment, it is possible to employ other well-known expanding type of holding means. Furthermore, the sequence of connection to the flexible tube 12 of these connecting cylinder 14 and the intermediate cylinder 20 could be reversed.

At the tip end of the above-described intermediate cylinder 20 is integrally fitted a fixed cylinder 24 accommodating a drive motor 23 therein, and at the tip end portion of this fixed cylinder 24 is integrally fitted a support cylinder 27 which rotatably support a rotary cylinder 26 via a bearing 25. A transmission gear 29 rotatably supported by the support cylinder 27 and the fixed cylinder 24, is meshed with a drive gear 28 of the drive motor 23, and further, this transmission gear 29 is meshed with an inner gear 30 formed at the base end portion of the rotary cylinder 26. Accordingly, by actuating the drive motor 23, the rotary cylinder 26 is rotationally driven via the transmission gear 29. On this rotary cylinder 26 are arranged a plurality of permanent magnets 31 at equal angular intervals in an annular array, and a rotational phase of the rotary cylinder 26 with respect to the support cylinder 27 can be detected as a result of relative movement between the permanent magnets 31 and rotation detecting coils 32 provided on the support cylinder 27 so as to oppose to these permanent magnets 31. Cables, not shown, connected to the drive motor 23 and the rotation detecting coils 32 extend through the intermediate cylinder 20, the connecting cylinder 14 and the flexible tube 12 and are connected to a control device not shown. This control device is also connected to a laser oscillator as will be described later, besides the aforementioned position detector 13 and the air feed/discharge device, so as to issue necessary control commands for these devices.

At the center of the tip end portion of the support cylinder 27 is fixedly secured a tip end portion of an optical fiber 33 which extends through the support cylinder 27, the fixed cylinder 24, the intermediate cylinder 20, the connecting cylinder 14 and the flexible tube 12 and connects with a laser oscillator not shown. In front of the emitting end surface 34 of this optical fiber 33 which transmits a welding laser beam 18 issued from the laser oscillator, is disposed a light focusing optical system 36 which focuses the welding laser beam 18 emitted in a diverging state from the emitting end surface of the optical fiber 33 towards a welding location 35 between the heat transfer tube 11 and the mending sleeve 17, as fixedly held within the rotary cylinder 26. In addition, a reflecting mirror 37 disposed in front of the light focusing optical system 33 for leading the welding laser beam 18 to the above-mentioned welding location 35, is fixedly secured to the rotary cylinder 26 in an inclined state with respect to the rotary axis of the rotary cylinder 26, and in association with the reflecting mirror 37, in the rotary cylinder 26 is formed a beam irradiation hole 38 for leading the welding laser beam 18 reflected by the reflecting mirror 37 to the welding location 35.

In addition, in the illustrated embodiment, a sleeve 39 is integrally fitted around the rotary cylinder 26, a channel 40 communicating with the above-mentioned beam irradiation hole 38 is formed between the sleeve 39 and the outer circumference of the rotary cylinder 26 as directed in the longitudinal direction of the rotary cylinder 26, a communication hole 42 communicating with the base end portion of this channel 40 and an annular groove 41 formed on the outer circumferential surface of the support cylinder 27, is formed in the rotary cylinder 26, and a gas feed tube 43 extending through the fixed cylinder, the intermediate cylinder 20, the connecting cylinder 14 and the flexible tube 12 and connected to a gas feed source not shown for feeding gas such as, for example, argon gas, is communicated with the aforementioned annular groove 41. Thus, the gas fed through the gas feed tube 43 is ejected from the beam irradiation hole 38 to the space between the reflecting mirror 37 and the welding location 35, and thereby it can be preliminarily prevented that welding fume generated during a welding operation would adhere to the surfaces of the reflecting mirror 37 and the light focusing optical system 36 and these elements would be damaged by the welding laser beam 18. As the gas used in this case, gas having a high molecular weight is favorable, but it will be also effective to use an inert gas such as argon gas, helium gas, etc. that is used as a shield gas in welding.

At the tip end of the above-described rotary cylinder 26 is integrally projected a center shaft section 46 which supports via bushes 44 a roller supporting sleeve 45 in a relatively rotatable manner, and on the roller supporting sleeve 45 fitted around the center shaft section 46 are slidably fitted a pair of annular sliders 47. A pair of links 49 rotatably supporting a roller 48 which comes into contact with the inner surface of the heat transfer tube 11, are respectively secured to these sliders 47 via pins, and such sets of a roller 48 and links 49 are disposed in multiple (three sets in the illustrated embodiment) around the roller supporting sleeve 45 at an equal angular interval. Between the opposite end portions of the roller supporting sleeve 45 and the sliders 47 are respectively interposed compression springs 50, hence the roller 48 is automatically pushed against the inner surface of the heat transfer tube via the links 49 by the resilient force of these compression springs 50, and thereby the rotary cylinder 26 can be held in a concentric relation to the heat transfer tube 11. It is to be noted that as the guide means, besides the above-described embodiment, any other means could be employed so long as it can hold the rotary cylinder in a concentric relation to the heat transfer tube.

In operation, the tip end portion of the laser beam welding apparatus according to the present invention is inserted into the heat transfer tube 11 within which a mending sleeve 17 has been preliminarily fitted, and after positioning has been done by means of the position detector 13 so that the beam irradiation hole 38 and the welding location 35 may oppose to each other, compressed air is fed into the air bag 19 to fixedly hold the intermediate cylinder 20 with respect to the heat transfer tube 11. Then, the drive motor 23 is actuated to rotationally drive the rotary cylinder 26, at the same time the welding laser beam 18 is made to irradiate the welding location 35, and thereby circumferential seal welding between the heat transfer tube 11 and the mending sleeve 17 is carried out. In this case, since the rotary cylinder 26 is held in a concentric relation to the heat transfer tube 11, the irradiating condition of the welding laser beam 18 to the welding location 35 is kept constant, and excellent circumferential seal welding becomes possible.

It is to be noted that while it is necessary to set the welding locations 35 at two locations on the respective portions of the mending sleeve 17 on the opposite sides of the defective location of the heat transfer tube, in view of the laser beam welding, there is no need to set the welding locations 35 at the tube ends of the mending sleeve 17.

While the drive motor 23 was used as rotary drive means in the above-described embodiment, a cross-sectional structure of the rotary drive means according to a second preferred embodiment of the present invention is illustrated in FIGS. 2 and 3, FIG. 3 being a partial side view of the same structure as viewed in the direction of an arrow III in FIG. 2.

As shown in these figures, within the fixed cylinder 24 is slidably fitted a piston 51, two fluid feed/discharge tubes 52 and 53 are respectively connected to the inner space sections of the fixed cylinder 24 partitioned by this piston 51, and these fluid feed/discharge tubes 52 and 53 are extended through the intermediate cylinder 20 and a connecting cylinder and a flexible tube both not shown, and connected to a fluid feed/discharge device not shown. At the tip end portion of a piston sleeve 54 is projected a pin 56 on which a roller 55 is rotatably mounted, a straight guide hole 57 extending in the longitudinal direction of the support cylinder section 27 is formed in the support cylinder section 27 which is formed at the tip end portion of the fixed cylinder 24, also a spiral hole 58 is formed in the base end portion of the rotary cylinder 26, the roller 55 is engaged with this spiral hole 58, and the pin 56 could be also engaged with the guide hole 57.

In operation, under the illustrated condition, when pressurized liquid is fed to one fluid feed/discharge tube 52, the piston 51 moves leftwards as viewed in FIG. 2, hence the pin 56 and the roller 55 would reach the left end of the guide hole 57, and due to the fact that the roller 55 moves straightly along the guide hole 57 as held in the spiral hole 58, the rotary cylinder 26 would rotate, for example, by one revolution. During this operation, since an axial force is exerted upon the rotary cylinder 20, a rotary bearing 59 and bushes 60 and 61 are interposed between the rotary cylinder 20 and the support cylinder 56, so that smooth rotation can be realized thereby.

It is to be noted that in FIG. 2, component members having the same functions as those shown in FIG. 1 are given like reference numerals.

Figure 4:
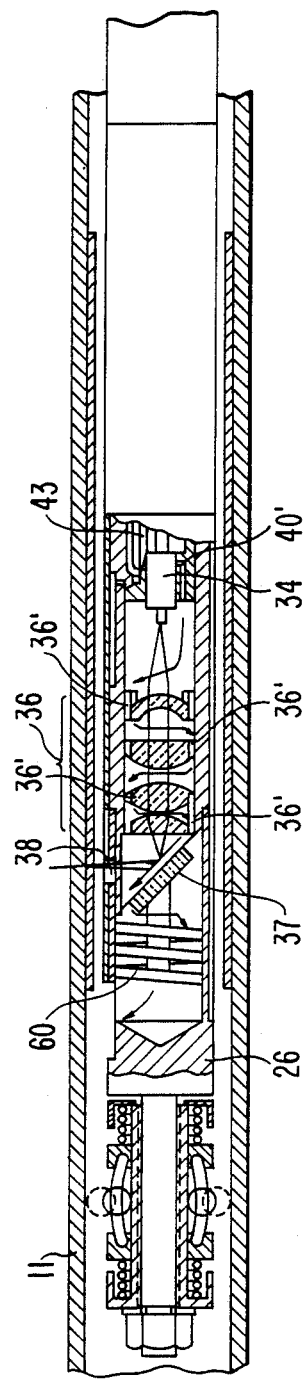
FIG. 4 is a cross-section view showing the vicinity of a welding section according to a third preferred embodiment of the present invention.

FIG. 4 is a longitudinal cross-section view showing the vicinity of a welding portion in a third preferred embodiment of the present invention. In this embodiment, the section extending from the flexible tube and the connecting cylinder up to the rotary cylinder has a similar structure to that employed in the above-described first and second preferred embodiments. However, in this particular embodiment, as shown in FIG. 4, a channel 40' communicating with the communication hole 42 in the rotary cylinder 26 is provided, gas is fed into the rotary cylinder 26 so that it may be led to the beam irradiation hole 38 similarly to the first and second preferred embodiment above, and also the gas may be led from the channel 40' through the light focusing optical system 36 to the reflecting mirror 37. Arrows in this figure indicate this flow of gas. The circumferences of the respective lenses in the light focusing optical system 36, respectively, have a notch 36' at one location diametrically opposed to that of the adjacent lens. Consequently, the gas flows in a zig-zag manner along the surfaces of the respective lenses through these notches, and so, it can effectively cool the light focusing optical system 36 and also can achieve cleaning thereof. This cooling and cleaning gas flows further along the reflecting surface of the reflecting mirror 37 and along a spiral cooling fin 60 provided on the backside of the cooling mirror 37.

Figure 7:
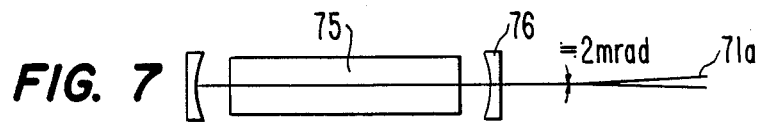
FIG. 7 is a schematic side view showing a $CO_2$ laser oscillator.
Figure 8:
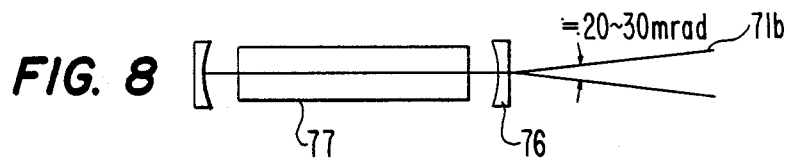
FIG. 8 is a schematic side view showing an Nd:YAG (Yttrium Aluminum Garnet) laser oscillator.

Now a fourth preferred embodiment of the present invention will be described. A $CO_2$ gas laser oscillator 75 and a light focusing mirror 76 are shown in FIG. 7. This $CO_2$ gas laser oscillator can emit a laser beam 71a having a divergent angle approximately equal to 2 mrad. In addition, in FIG. 8 are shown an Nd:YAG laser 77 and a light focusing mirror 76. This Nd:YAG laser can emit a laser beam 71b having a divergent angle approximately equal to 20–30 mrad.

Figure 9:
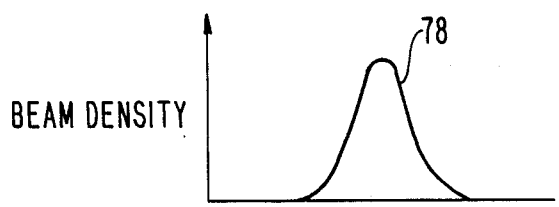
FIG. 9 is a diagram illustrating an energy density distribution in a laser beam generated from a $CO_2$ laser oscillator.
Figure 10:
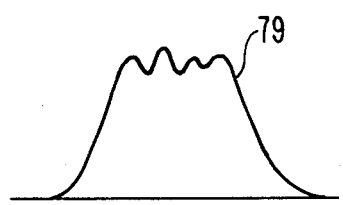
FIG. 10 is a diagram illustrating an energy density distribution in a laser beam generated from an Nd:YAG laser oscillator.
Figure 11:
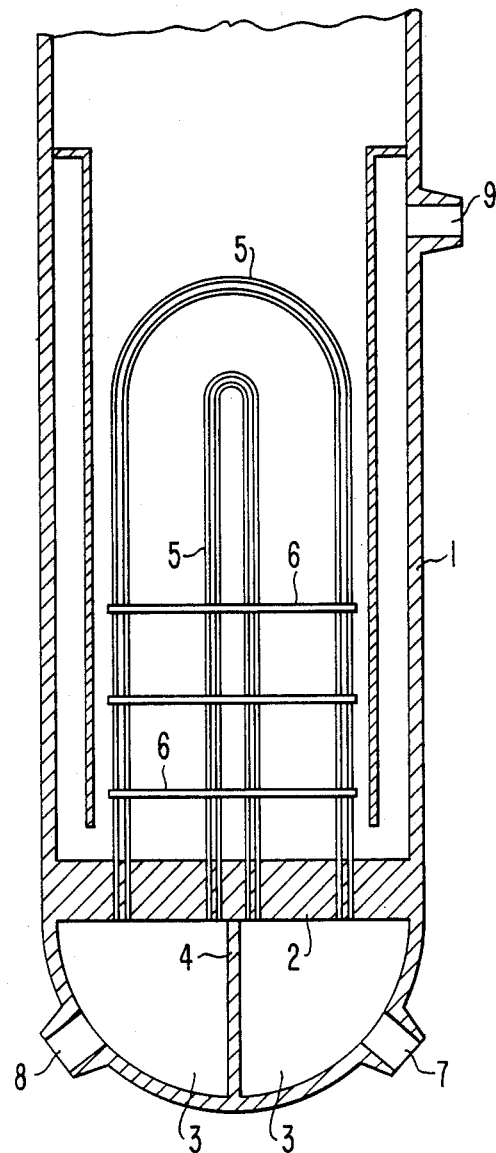
FIG. 11 is a cross-section view showing an outline of a steam generator.
Figure 12:
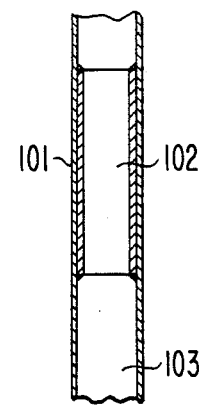
FIG. 12 is a cross-section view showing the state of mending a heat transfer tube in a steam generator.

In the case where the $CO_2$ gas laser oscillator 75 shown in FIG. 7 is of high power type, since the divergent angle of the laser beam 71a is small, a single mode as shown in FIG. 9 can be obtained. However, in the case of the Nd:YAG laser 77 shown in FIG. 8, even if it is of high power type, only a multi-mode a shown in FIG. 10 can be obtained because the divergent angle of the laser beam is large, and since the laser beam is poor in spatial coherency, despite of the fact that the wavelength of this laser beam is shorter than that of the $CO_2$ gas laser oscillator 75, there was a problem that a laser beam having a high energy density equivalent to that of the $CO_2$ gas laser oscillator could not be obtained.

Taking into consideration the aforementioned problem in the prior art, according to this fourth preferred embodiment, a laser beam transmission system in the circumferential laser beam welding apparatus in a tube has been improved.

Figure 5:
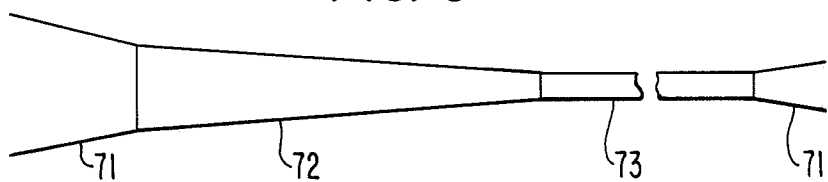
FIGS. 5 and 6 are schematic side views showing a fourth preferred embodiment of the present invention, FIG. 5 showing use of a tapered fiber, and FIG. 6 showing use of a tapered fiber and a large-diameter fiber.
Figure 6:
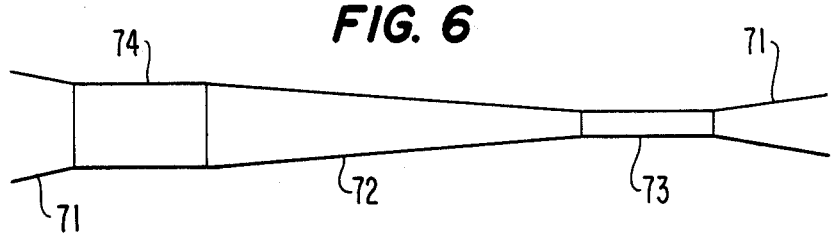

FIG. 5 shows a laser beam transmission system provided with a tapered fiber 72 for transmitting a laser beam emitted from a laser oscillator and passed through a light focusing lens, and also provided with a small-diameter fiber 73 for transmitting a laser beam 71 emitted from the tapered fiber 72 to a desired location. On the other hand, FIG. 6 shows another laser beam transmission system further provided with a large-diameter fiber 74 for transmitting a laser beam 71 emitted from an Nd:YAG laser oscillator (See 77 in FIG. 8) and passed through a light focusing lens (See 76 in FIG. 8) to the above-described tapered fiber 72. The above-described small-diameter fiber 73 is used as the optical fiber 33 shown in FIGS. 1 to 4.

According to this preferred embodiment, a laser beam 71 emitted from a laser oscillator such as, for instance, the Nd:YAG laser oscillator 77, enters into the tapered fiber 71 via the light focusing lens 76, during the passage through the tapered fiber 72 the laser beam diameter is thinned, then the laser beam 71 enters into the small-diameter fiber 73, and then the laser beam is transmitted through the small-diameter fiber 73 to a desired welding position. In this way, the laser beam has its diameter reduced during the passage through the tapered fiber 72 to enter the small-diameter fiber and to be transmitted through the small-diameter fiber, and therefore, a laser beam having a high energy density can be transmitted to a welding position.

According to the present invention, since a laser beam is used for circumferential seal-welding between a work tube and a mending sleeve, excellent circumferential seal-welding has become possible without being influenced at all by the properties of materials of the mending sleeve and the work tube. In addition, there is no need to set a welding location at the tube end of the mending sleeve, and so, the positioning work for the welding location can be greatly simplified as compared to the welding apparatus in the prior art.

Furthermore, according to the present invention, by making a gas flow pass through a welding point and/or an optical train (optical system), contamination of the optical system can be prevented and cooling of the optical system can be achieved. Hence, deterioration of the performance of the optical system can be prevented.

Still further, owing to the connection of the optical fiber to the laser beam generator by the intermediary of a tapered fiber and a lens, the present invention makes it possible to transmit a laser beam having a high energy density to the welding position.

While a principle of the present invention has been described above in connection to preferred embodiments of the invention, it is intended that all matter contained in the above description and illustrated in the accompanying drawings shall be interpreted to be illustrative and not as a limitation to the scope of the invention.

What is claimed is:

1. A laser beam welding apparatus for an inner circumferential surface of a tube, comprising:
    an elongated flexible tube containing an optical fiber extended along the length thereof so as to transmit a laser beam;
    position detecting means disposed in the vicinity of the tip end of said flexible tube to determine relative positioning thereof with respect to a work tube in which said flexible tube is inserted;
    holding means provided with an expander and disposed adjacent to said position detecting means for holding said tip end of the flexible tube in said work tube;
    rotary drive means disposed closer to said tip end of the flexible tube than said holding means;
    a rotary cylinder connected to said rotary drive means to be rotated with respect to said flexible tube;
    guide means mounted on said rotary cylinder in a relatively rotatable manner with respect to said rotary cylinder and held in contact with the inner surface of said work tube for supporting said rotary cylinder in a concentric relation to said work tube; and
    an optical train arranged within said rotary cylinder for receiving a laser beam emitted from said optical fiber and focusing a reflected laser beam onto the inner surface of said work tube.

2. A laser beam welding apparatus as claimed in claim 1, wherein said rotary drive means is composed of an electric motor and a gear train.

3. A laser beam welding apparatus as claimed in claim 1, wherein said rotary drive means is composed of a pneumatic rotary actuator.

4. A laser beam welding apparatus as claimed in claim 1, further including a gas tube extended along and in said flexible tube and a gas flow channel defined so as to conduct compressed gas to a welding point on the inner surface of said work tube.

5. A laser beam welding apparatus as claimed in claim 1, further including another gas flow channel adapted to receive the compressed gas and extended to a reflector in said optical train so as to conduct cooling and cleaning gas along the surfaces of optical elements in said optical train.

6. A laser beam welding apparatus as claimed in claim 1, wherein said optical fiber is connected to a laser beam generator through a tapered filter and a lens adapted to collect a laser beam emitted from said generator and transmit the beam to the optical fiber.

* * * * *